United States Patent
Hoffmann et al.

(10) Patent No.: US 9,615,692 B2
(45) Date of Patent: Apr. 11, 2017

(54) GRILL AND/OR FRYING PLATE FOR THE USE ON COOKING HOBS

(75) Inventors: Harald Hoffmann, Rothenburg o. d. Tauber (DE); Alwin Neukamm, Roghenburg o. d. Tauber (DE); Bjorn Leyh, Rothenburg o. d. Tauber (DE); Jurgen Leikam, Rothenburg o. d. Tauber (DE); Ulrich Hautle, Rothenburg o. d. Tauber (DE)

(73) Assignee: Electrolux Home Products Corporation N.V., Brussels (BE)

( * ) Notice: Subject to any disclaimer, the term of this patent is extended or adjusted under 35 U.S.C. 154(b) by 579 days.

(21) Appl. No.: 14/005,611

(22) PCT Filed: Mar. 22, 2012

(86) PCT No.: PCT/EP2012/055074
§ 371 (c)(1),
(2), (4) Date: Sep. 17, 2013

(87) PCT Pub. No.: WO2012/139867
PCT Pub. Date: Oct. 18, 2012

(65) Prior Publication Data
US 2014/0021196 A1     Jan. 23, 2014

(30) Foreign Application Priority Data
Apr. 14, 2011   (EP) ..................... 11003146

(51) Int. Cl.
*H05B 6/12*     (2006.01)
*A47J 37/06*    (2006.01)
*A47J 37/10*    (2006.01)

(52) U.S. Cl.
CPC ......... *A47J 37/0676* (2013.01); *A47J 37/067* (2013.01); *A47J 37/10* (2013.01)

(58) Field of Classification Search
CPC ....... A47J 37/067; A47J 37/0676; A47J 37/10
(Continued)

(56) References Cited

U.S. PATENT DOCUMENTS

| 5,131,320 A | 7/1992 | Jensen et al. |
| 5,782,165 A | 7/1998 | Glenboski et al. |

(Continued)

FOREIGN PATENT DOCUMENTS

| DE | 102009019765 | 11/2010 |
| FR | 2929485 | 10/2009 |

(Continued)

OTHER PUBLICATIONS

JP 05-290962A Translation, Okada et al., Inductive heating cooker, Nov. 5, 1993, AIPN online translation (Japan Patent Office).*

(Continued)

*Primary Examiner* — Quang Van
(74) *Attorney, Agent, or Firm* — Pearne & Gordon, LLP

(57) ABSTRACT

A grill and/or frying plate for use on an induction cooking hob, including at least one grill section and at least one section different from the grill section, in particular a frame section or a warming section. When the grill and/or frying plate is mounted to the cooking hob, the at least one grill section is at least partially arranged directly above at least one heating element of the cooking hob and that the at least one section different from the grill section is at least partially arranged in a position where no heating element is arranged below. A recess and/or a securing recess and/or a fixation groove are arranged in a region that delimits the grill section from the section different from the grill section, in such a way that the heat transfer from the grill section to the section different from the grill section is reduced.

14 Claims, 3 Drawing Sheets

Figure 1:
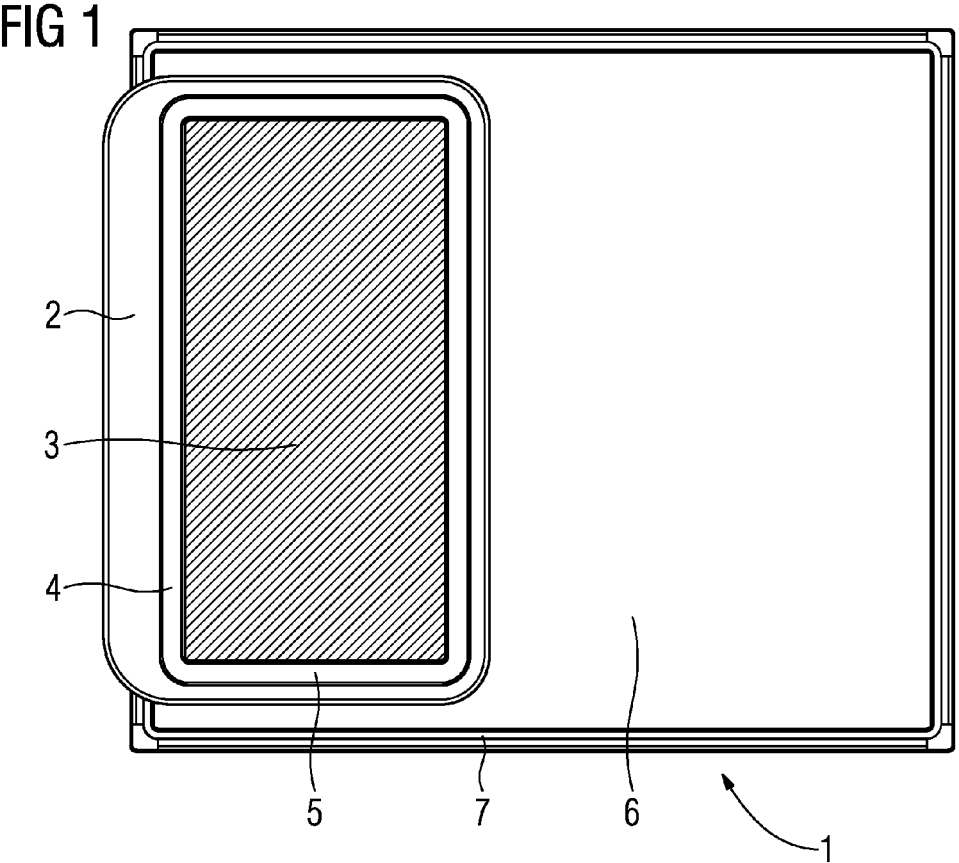

(58) Field of Classification Search
USPC ....... 219/620, 621, 622, 624, 627, 632, 647,
219/667; 99/372, 377, 378, 380, 391
See application file for complete search history.

(56) References Cited

U.S. PATENT DOCUMENTS

| | | | |
|---|---|---|---|
| 6,300,602 B1 * | 10/2001 | Platt | ........................ H05B 3/74 219/445.1 |
| 2009/0305032 A1 * | 12/2009 | Striegler | ............... C03C 17/008 428/336 |
| 2010/0154654 A1 | 6/2010 | Northcut et al. | |

FOREIGN PATENT DOCUMENTS

| | | | |
|---|---|---|---|
| JP | 05290962 A | * | 11/1993 |
| JP | H05290962 A | | 11/1993 |

OTHER PUBLICATIONS

International Search Report for PCT/EP/2012/055074, dated Apr. 27, 2012, 2 pages.
Examination Report issued in corresponding Australian patent application No. 2012242101, dated Jun. 10, 2016, 3 pages.
Examination Report issued in corresponding Australian Patent Application No. 2012242101, dated Nov. 16, 2016, 3 pages.

* cited by examiner

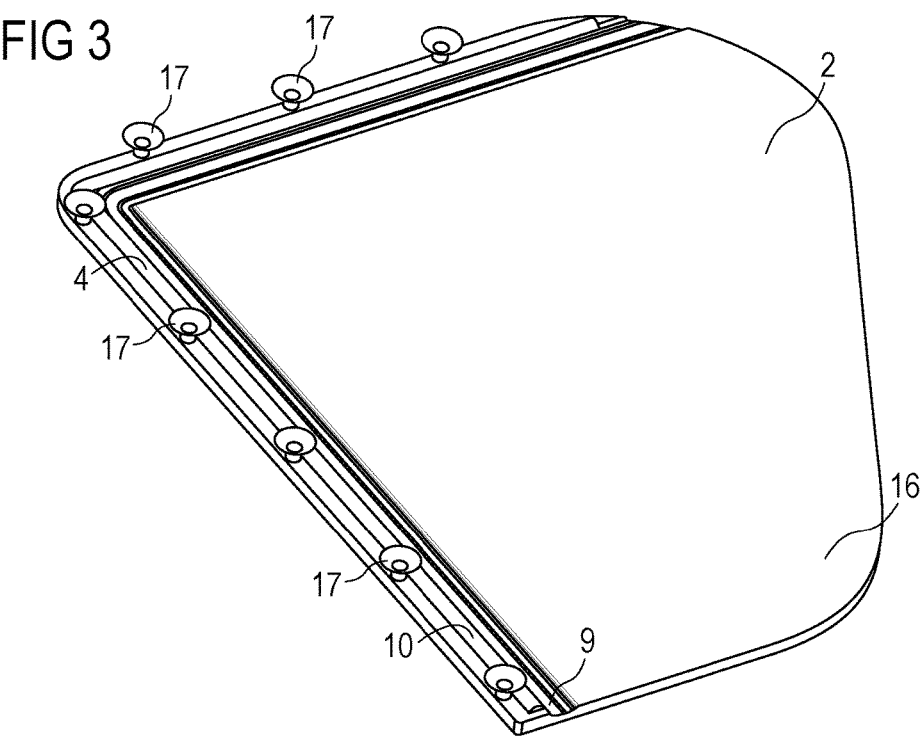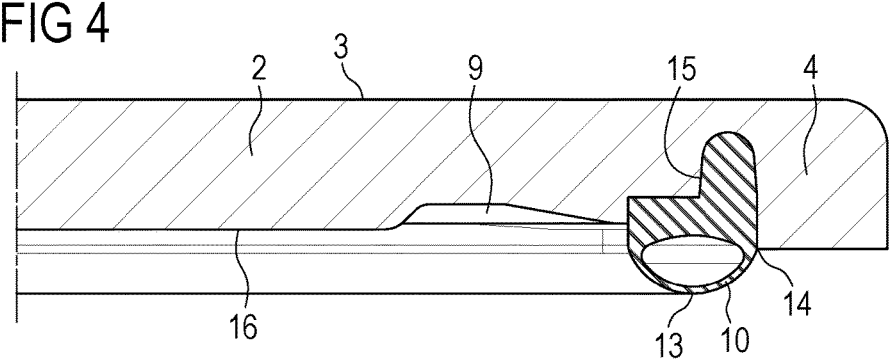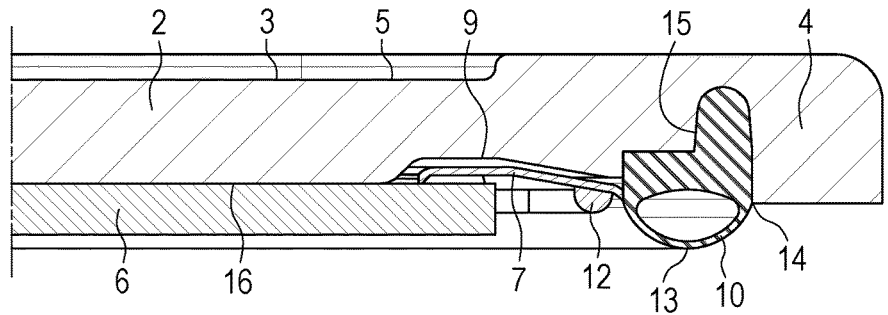

GRILL AND/OR FRYING PLATE FOR THE USE ON COOKING HOBS

The present invention relates to a grill and/or frying plate for the use on a cooking hob with a cooking hob plate.

DE 75 24 686 U describes a grill device made of a flat thin plate which is provided with ribs, a circumferential grease groove, hand grips and which is to be manufactured in one manufacturing step from a material piece in such a dimension that it covers 2, 3 or 4 electric heating plates or gas flames on a cooking hob. The grill device might have different shapes and can be made of glas, ceramic, aluminium, stone, clay, sheet metal or cast iron.

DE 37 14 207 A1 discloses a grill plate with a planar lower side and an upper side which is provided with ribs and bars. Further it comprises a protruding circumferential edge, wherein the edge forms with the lower side a hollow fixture to which a hot plate is adjusted thereto.

EP 0 627 600 A2 describes a movable grill plate with a plane or structured upper side as a grill surface with a circumferential grease groove and lateral hand grips, whereas the lower side is formed as a contact surface for being heated from an external heat source and that the grill plate can be applied onto the cooking hob plate, in particular on a glass ceramic cooking hob plate, and that the grill plate is made of a material of high heat capacity.

All known devices for grilling or frying upon a cooking hob are delimited in several ways in their usability.

An object of the present invention is to create a grilling and/or frying plate which is usable on different cooking hobs and which requires only a few fat in the cooking process. Further a grill or frying pan shall be created which allows secure operation upon different types of cooking hobs.

A solution of this object according to the invention is defined and characterized by independent claim 1. The dependent claims refer to further embodiments of the present invention.

According to the present invention a grill and/or frying plate for the use on a cooking hob with a cooking hob plate, in particular for the use on an induction cooking hob, comprises at least one grill section and at least one section different from the grill section, in particular a frame section or a warming section, wherein the grill and/or frying plate is formed and dimensioned such, that, when the grill and/or frying plate is mounted to the cooking hob, the at least one grill section is at least partially arranged directly above at least one heating element of the cooking hob and that the at least one section different from the grill section is at least partially arranged in a position where no heating element is arranged below, and wherein a recess and/or a securing recess and/or a fixation groove are arranged in a region that delimits the grill section from the section different from the grill section, in such a way that the heat transfer from the grill section to the section different from the grill section is reduced.

Thus, a grill or frying plate is created which comprises a section whereupon food for being grilled or fried can be positioned and other sections with different functions, such as a warming section, whereupon food which is already prepared can be positioned for keeping it warm or a frame section where a user can catch and handle the grill or frying pan without being burned from high temperature.

According to a further embodiment of the invention the grill and/or frying plate comprises a gasket, in particular a silicone gasket, which is provided in a region that delimits the grill section from a frame section, wherein the gasket supports the grill or frying plate on a worktop which is at least partially surrounding the cooking hob, in particular such that slipping of the grill or frying plate is at least partially prevented.

By means of such a gasket it is possible to support the grill and/or frying plate on a worktop. The grill or frying plate can be brought in a secure operating position by a user who can handle the grill or frying pan on the frame section. In such an arrangement it is secured, that the frame section which is the handling section of the device is not above the cooking hob in an operating position of the grill or frying plate.

According to a further advantageous embodiment of the invention the gasket comprises at least one flexible portion and at least one less flexible portion and wherein the gasket as able to compensate an offset which is formed between a surface of the cooking hob plate and a surface of the worktop, in particular wherein the less flexible portion can be compressed to compensate the offset.

A cooking hob usually projects in a vertical direction over the worktop which encircles the cooking hob and in particular the cooking hob plate. Thus, an offset is created between the surface of the cooking hob plate and the surface of the worktop. The grill and/or frying plate is able to compensate this offset and to provide a secure support in an operating position.

According to a further embodiment of the invention a fixation groove is formed and/or dimensioned such that a cooking hob frame which encircles the cooking hob plate at least partially can engage into and wherein the grill and/or frying plate is held and/or fixated in its position thereby.

Thus, the grill and/or frying plate is usable for both cooking hobs, having or having not cooking hob frames. In the case a cooking hob frame is provided, the grill and/or frying pan is additionally fixated in its operating position.

According to a further advantageous embodiment of the invention the fixation groove comprises at least one perpendicular angle, such that the grill and/or frying plate can be attached to the cooking hob frame in an angle region of the cooking hob.

In such an embodiment the grill and/or frying plate is arranged on the cooking hob in a corner or angle region of the cooking hob. Thus, the corner or angle of the cooking hob frame in engagement with the fixation groove forms a form closure. The grill and/or frying plate is secured in its operating position.

According to a further embodiment of the invention the grill and/or frying plate is provided with suction cups which attach and/or fixate the grill and/or frying plate to the worktop.

Suction cups enable to fasten the grill and/or frying plate to the worktop in an easy way.

According to a further embodiment of the invention the grill plate is made of a material which is not adapted for induction heating and wherein the grill section comprises a coating which is adapted for induction heating.

Such a grill and/or frying plate is adapted to the use on induction cooking hobs. Warming section and/or frame section are not enabled to be inductively heated. The grill section can be heated inductively. The grill and/or frying plate can safely be used independent from whether the user positions it correctly on the cooking hob.

According to a further embodiment of the invention the grill section comprises a material thickness which is larger than the material thickness of the frame section and/or of the warming section.

When the grill and/or frying plate is completely made of inductive material, more heat is generated in the thicker material than in the thinner material which is advantageous for the safety of the device. Also in the case that the grill and/or frying plate is not made of an inductive material and comprises a coating to be inductively heated in the grill section, the heat transfer from the grill section to the frame section and/or the warming section is reduced.

In a further embodiment of the invention the grill section and the warming section are separate parts which are connected to each other by a detachable or non-detachable connection.

Thus, the heat transfer between grill section and warming section is reduced more. Manufacturing of the device in made more easy and flexible.

Figure 2:
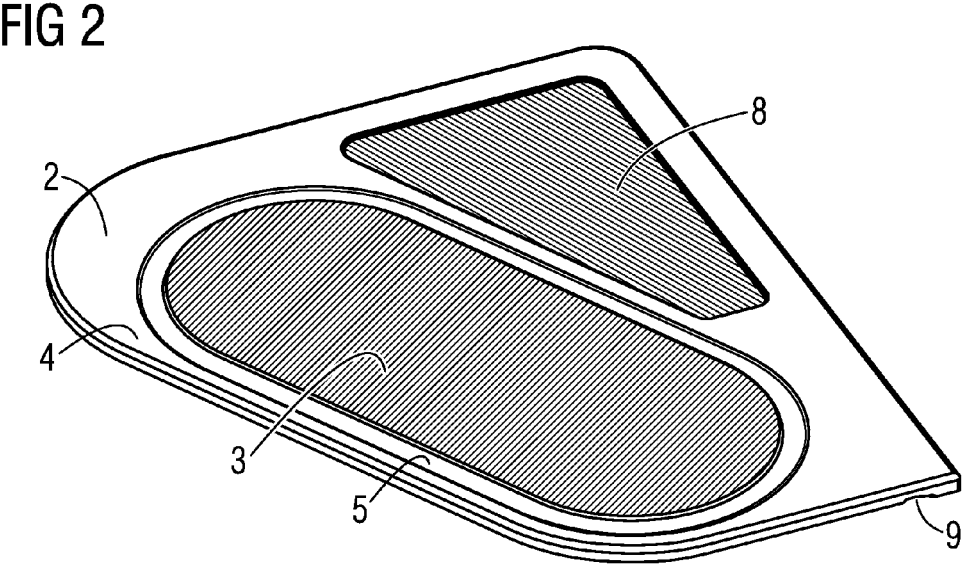
Figure 6:
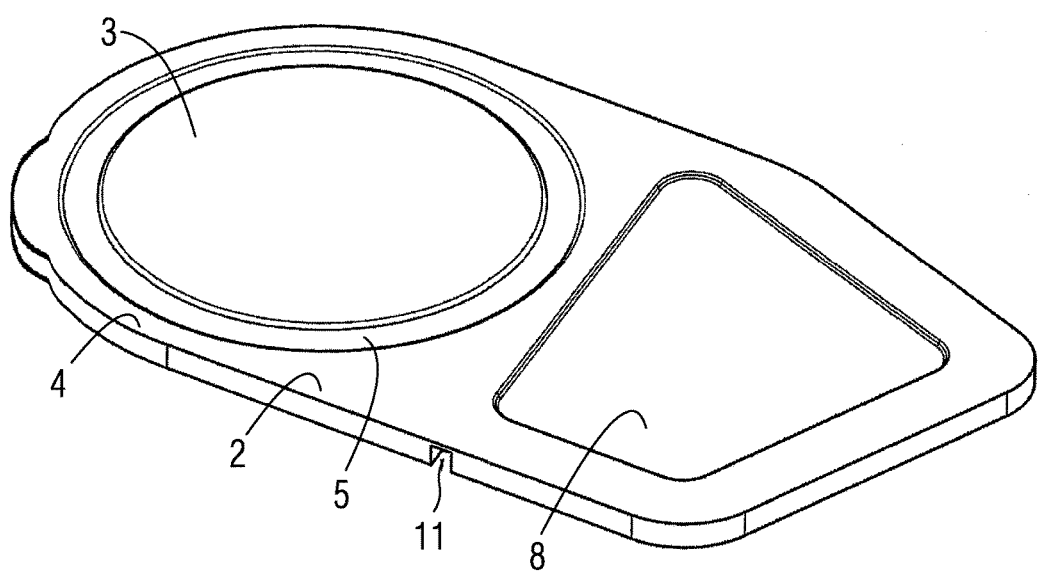

FIG. 1 is a top view of a cooking hob whereupon a grill plate embodying the invention is applied FIG. 2 is a perspective view of a grill plate embodying the invention having a grill section and a warming section FIG. 3 is a perspective view of the lower side of the grill plate according to FIG. 2 and embodying the invention FIG. 4 is a sectional view of a grill plate embodying the invention FIG. 5 is a sectional view of a grill plate embodying the invention which is mounted to a cooking hob having a cooking hob frame FIG. 6 is a perspective view of a grill plate embodying the invention comprising an alternative shape FIG. 1 shows a cooking hob 1 comprising a cooking hob plate 6 and a cooking hob frame 7. The cooking hob 1 has a substantially rectangular shape and is usually inserted within a cutout of a not shown kitchen worktop. The cooking hob plate 6 can be made of a glass ceramic and is to be supported on the kitchen worktop. A grill or frying plate 2 is attached to the cooking hob 1 such that it covers a part of the surface of the cooking hob plate 6. The size and shape of the grill plate 2 is designed in such way, that it covers the surface of the cooking hob plate 6 where heating elements of the cooking hob 1 are beneath. Heating elements might be e.g. electrical heating elements or induction heating elements.

The grill plate 2 comprises a grill section 3 whereupon food to be grilled or to be fried can be positioned. Further it comprises a frame section 4 and a grease groove 5 for collecting hot fat or grease which emerges from the grilling or frying process. The surface of the grill section 3 is structured with ribs, but can also be unstructured or plane. The grill or frying plate 2 is made of cast iron which allows an easy and flexible forming in the manufacturing process. Grill or frying plates 2 of different forms can be produced depending on the different forms of the cooking hobs for which the grill or frying plates 2 shall be used.

FIG. 2 shows a grill plate 2 having a grill section 3 and a warming section 8. The grill plate 2 is arranged on the cooking hob, wherein the grill section 3 is arranged above heating elements of the cooking hob 1 such that an at least substantial part of the grill section 2 is arranged directly above heating elements and that at least a substantial part of the grill section 2 is heated by the heating elements. The warming section 8 of the grill plate 2 is arranged on the cooking hob 1 such that at least a substantial part of the warming surface 8 is arranged in a position where no heating elements are provided beneath the warming section 8 of the grill plate 2. Additionally or alternatively it is possible to adapt the grill plate 2 to the cooking hob 1 in such way that the heating elements which are arranged beneath the grill section 3 can be operated, wherein heating elements which are arranged beneath the warming section 8 cannot be operated.

FIG. 3 shows a lower side of a grill plate 2 as shown in FIG. 2. The grill plate 2 has a substantially flat or plane lower surface 16 which is provided for coming or being in contact with a flat or planar cooking hob plate of a cooking hob. The grill plate 2 comprises a fixation groove 9, wherein a cooking hob frame 7 can engage when the grill plate 2 is in operating position. The fixation groove 9 is formed such that the grill plate 2 is positioned in a corner of the cooking hob 1 in an operating position. By means of the fixation groove 9 which is arranged perpendicular and follows the form of the cooking hob frame 7, the grill plate 2 is supported and fixated to the cooking hob 1 in operating position at least partially by form closure. The fixation groove 9 is arranged in the frame section 4 of the grill plate 2. A silicone gasket 10 is arranged adjacent to the fixation groove 9 for sealing purposes.

FIG. 4 shows a sectional view of a grill plate 2. The grill plate 2 has a grill section 3 and a frame section 4. Further the grill plate 2 comprises a silicone gasket 10 which is inserted in a securing recess 15 having a cross section with a shape corresponding to the shape of the silicone gasket 10. The securing recess 15 has the effect that the cross sectional surface of the grill plate 2 which enables heat transfer from the grill section 3 to the frame section 4 is reduced. Thus, the temperature of the frame section 4 is allowed to be on a lower level.

The silicone gasket can be made of a heat resistant silicone profile consisting of one or several parts. The silicone gasket 10 can comprise a flexible portion 13 and a less flexible portion 14. In an operating position of the grill plate 2, the grill plate 2 is positioned on the cooking hob. By means of the flexible portion 13 an offset between worktop surface and the surface of the cooking hob 1 can be compensated. The silicone gasket 10 can be inserted in a securing recess 15 of the grill plate 2 or screwed or glued thereto. Further the silicone gasket 10 is made of a material which has anti-slip properties, such that the grill plate 2 is fixed or hold in its position by the silicone gasket 10 even when unintended pushes or impacts act on the grill plate 2.

FIG. 5 shows a sectional view of a grill plate 2 in a state mounted to a cooking hob 1. The grill plate 2 has a grill section 3, a frame section 4 and a grease groove 5. Further a silicone gasket 10, comprising a flexible portion 13 and a less flexible portion 14 is attached to the grill plate 2. The grill plate 2 is mounted or applied or attached to a cooking hob 1 having a cooking hob plate 6 and a cooking hob frame 7. A cooking hob frame gasket 12 is provided for sealing the connection between a worktop and the cooking hob frame 7. The grill plate 2 bears on the cooking hob plate 6 superficially.

The fixation groove 9 is arranged above the cooking hob frame 7 which engages into the fixation groove 9 and fixates the grill plate 2 in its position. Also the silicone gasket 10 has a fixating effect on the grill plate 2 by means of its anti-slip properties. The flexible portion 13 of the silicone gasket 10 is able to compensate an offset which can emerge between worktop surface and/or the cooking hob frame 7 and the surface of the cooking hob 1.

Thus, the grill plate 2 can be used for both cooking hobs with cooking hob frames or cooking hobs without cooking hob frames. It is also usable for cooking hobs without cooking hob frames which comprise different geometries on the edges of glass ceramic plates.

Additionally or alternatively to the silicone gasket 10, suction cups 17 can be attached to the grill plate 2. The suction cups 17 adhere to the worktop and, thus, fasten the grill plate 2 to the worktop.

FIG. 6 shows a grill plate 2 having a grill section 3, a frame section 4 and a warming section 8. Further it comprises a grease groove 5. In a section between the grill section 3 and the warming section 8 a recess 11 is provided. By means of this recess 11, the cross section, or more precisely the cross sectional surface, of the grill plate 2 is reduced in this position. Thus, the possibility of heat transfer, i.e. the heat conduction, from the grill section 3, which is heated by the heating elements, to the warming section 8 is reduced.

The grill or frying plate 2 can be adapted especially for the use in induction cooking hobs. To increase the heat generation in the induction heating process, the material thickness of the grill section 3 can be made larger in comparison to the warming section 8 or the frame section 4. Thus, the heat generation in the grill section 3 is increased wherein it is possible to reduce the heat generation in the sections which shall not exceed a certain temperature.

Further it is possible to produce the grill or frying pan 2 from a material which cannot be heated inductively or which has a low ability for induction heating. Such material might be non-ferromagnetic material. The grill section 3 is coated with a material comprising a high ability for being inductively heated. Thus, the heat generation is delimited to the region of the grill section 3. The frame section 4 and the warming section 8 are only warmed by a heat transfer from the grill section 3.

A further possibility to reduce the heat transfer from the grill section 3 to the warming section 8 is to produce grill section 3 and warming section 8 as a separated parts and to assemble these sections an own step. E.g. it is possible to connect the grill section 3 to the warming section 8 by a screw connection or by a gluing connection.

Of course, a grill or frying plate 2 embodying one or more of the inventive ideas as described above can be used in a cooking hob with electrical heating elements, but also in an induction cooking hob.

The elements shown in the figures are designated as follows
1 Cooking hob
2 Grill or frying plate
3 Grill section
4 Frame section
5 Grease groove
6 Cooking hob plate
7 Cooking hob frame
8 Warming section
9 Fixation groove
10 Silicone gasket
11 Recess
12 Cooking hob frame gasket
13 Flexible portion
14 Less flexible portion
15 Securing recess
16 Lower surface
17 Suction cups

The invention claimed is:

1. Grill and/or frying plate (2) for the use on a cooking hob (1) with a cooking hob plate (6) for use on an induction cooking hob, comprising:
at least one grill section (3) and at least one section different from the grill section (3) selected from among a frame section (4) and a warming section (8), wherein the grill and/or frying plate (2) is formed and dimensioned such, that, when the grill and/or frying plate (2) is mounted to the cooking hob (1), the at least one grill section (3) is at least partially arranged directly above at least one heating element of the cooking hob and that the at least one section different from the grill section (3) is at least partially arranged in a position where no heating element is arranged below, and wherein at least one of a recess (11), a securing recess (15) and a fixation groove (9) is arranged in a region that delimits the grill section (3) from the section different from the grill section, in such a way that the heat transfer from the grill section (3) to the section different from the grill section is reduced,
wherein the grill and/or frying plate (2) comprises a gasket (10), which is provided in a region that delimits the grill section (3) from the frame section (4), wherein the gasket (10) supports the grill or frying plate (2) on a worktop which is at least partially surrounding the cooking hob (1).

2. Grill and/or frying plate (2) according to claim 1, wherein the gasket (10) is a silicone gasket (10), configured to prevent slipping of the grill or frying plate (2) at least partially.

3. Grill and/or frying plate (2) according to claim 1, wherein the gasket comprises at least one flexible portion (13) and at least one less flexible portion (14) and wherein the gasket is configured to be compressed to compensate an offset which is formed between a surface of the cooking hob plate (6) and a surface of the worktop.

4. Grill and/or frying plate (2) according to claim 1, wherein the fixation groove (9) is formed and/or dimensioned such that a cooking hob frame (7) which encircles the cooking hob plate (6) at least partially can engage into and wherein the grill and/or frying plate (2) is held and/or fixated in its position thereby.

5. Grill and/or frying plate (2) according to claim 4, wherein the fixation groove (9) comprises at least one perpendicular angle, such that the grill and/or frying plate (2) can be attached to the cooking hob frame (7) at an angle region of the cooking hob (1).

6. Grill and/or frying plate (2) according to claim 1, wherein the grill and/or frying plate (2) is provided with suction cups configured to attach and/or fixate the grill and/or frying plate (2) to the worktop.

7. Grill and/or frying plate (2) according to claim 1, wherein the grill plate (2) is made of a material which is not adapted for induction heating and wherein the grill section (3) comprises a coating which is adapted for induction heating.

8. Grill and/or frying plate (2) according to claim 1, wherein the grill section (3) comprises a material thickness which is larger than the material thickness of the frame section (4) and/or of the warming section (8).

9. Grill and/or frying plate (2) according to claim 1, wherein the grill section (3) and the warming section (8) are separate parts which are connected to each other by a detachable or non-detachable connection.

10. Grill and/or frying plate (2) according to claim 1, comprising said recess (11) and said securing recess (15), each arranged in a region that delimits the grill section (3) from the section different from the grill section, in such a way that the heat transfer from the grill section (3) to the section different from the grill section is reduced.

11. Grill and/or frying plate (2) according to claim 1, comprising said recess (11) and said fixation groove (9), each arranged in a region that delimits the grill section (3) from the section different from the grill section, in such a way that the heat transfer from the grill section (3) to the section different from the grill section is reduced.

12. Grill and/or frying plate (2) according to claim 1, comprising said securing recess (15) and said fixation groove (9), each arranged in a region that delimits the grill section (3) from the section different from the grill section, in such a way that the heat transfer from the grill section (3) to the section different from the grill section is reduced.

13. Grill and/or frying plate (2) according to claim 1, comprising said recess (11), said securing recess (15), and said fixation groove (9), each arranged in a region that delimits the grill section (3) from the section different from the grill section, in such a way that the heat transfer from the grill section (3) to the section different from the grill section is reduced.

14. Grill and/or frying plate (2) according to claim 3, wherein said less flexible portion (14) can be compressed to compensate said offset.

\* \* \* \* \*